United States Patent [19]

Smolarek et al.

[11] Patent Number: 5,658,371
[45] Date of Patent: Aug. 19, 1997

[54] SINGLE BED PRESSURE SWING ADSORPTION PROCESS FOR RECOVERY OF OXYGEN FROM AIR

[75] Inventors: James Smolarek, Boston; Herbert Raymond Schaub, East Amherst; John Harry Fassbaugh, Elma; Timothy Mark Aaron, Williamsville, all of N.Y.

[73] Assignee: Praxair Technology, Inc., Danbury, Conn.

[21] Appl. No.: 554,175

[22] Filed: Nov. 6, 1995

[51] Int. Cl.⁶ .................................................. B01D 53/053
[52] U.S. Cl. ............................. 95/101; 95/102; 95/103; 95/105; 95/130
[58] Field of Search ........................... 95/95–105, 130

[56] References Cited

U.S. PATENT DOCUMENTS

| | | | |
|---|---|---|---|
| 3,430,418 | 3/1969 | Wagner | 95/100 |
| 3,564,816 | 2/1971 | Batta | 95/100 |
| 3,636,679 | 1/1972 | Batta | 95/100 |
| 3,717,974 | 2/1973 | Batta | 95/98 |
| 3,738,087 | 6/1973 | McCombs | 95/98 |
| 3,788,036 | 1/1974 | Lee et al. | 95/101 |
| 4,340,398 | 7/1982 | Doshi et al. | 55/25 |
| 4,475,930 | 10/1984 | Asztalos | 55/26 |
| 4,477,264 | 10/1984 | Kratz et al. | 55/25 |
| 4,534,346 | 8/1985 | Schlaechter | 128/205 |
| 4,561,865 | 12/1985 | McCombs et al. | 55/25 |
| 4,816,039 | 3/1989 | Krishnamurthy et al. | 55/26 |
| 4,892,566 | 1/1990 | Bansal et al. | 55/26 |
| 4,917,710 | 4/1990 | Haruna et al. | 95/102 |
| 5,015,272 | 5/1991 | Okada et al. | 95/100 X |
| 5,032,150 | 7/1991 | Knaebel | 95/98 X |
| 5,223,004 | 6/1993 | Etéve et al. | 95/98 |
| 5,226,933 | 7/1993 | Knaebel et al. | 95/96 |
| 5,228,888 | 7/1993 | Gmelin et al. | 95/96 |
| 5,370,728 | 12/1994 | LaSala et al. | 95/101 |
| 5,536,299 | 7/1996 | Girard et al. | 95/103 X |

FOREIGN PATENT DOCUMENTS

| | | | |
|---|---|---|---|
| 1-155926 | 6/1989 | Japan | 95/96 |
| 1-242120 | 9/1989 | Japan | 95/96 |

*Primary Examiner*—Robert Spitzer
*Attorney, Agent, or Firm*—Robert J. Follett

[57] ABSTRACT

A pressure swing adsorption process for the recovery of oxygen from air improves upon a prior art process by depressurizing the adsorbent bed within an adsorbent vessel to an intermediate pressure by releasing void space gas from the product end of the vessel to a low purity oxygen tank while concurrently evacuating the adsorbent vessel from the feed end. This action enables an increased speed of depressurization and a reduction of the cycle time. Further, the adsorbent bed is repressurized to an intermediate pressure from the product outlet end with gas from the low purity oxygen tank, while concurrently pressurizing the adsorbent vessel from the input feed end. This action increases the load time fraction for a feed/vacuum blower. Further, oxygen is introduced to the product end of the adsorbent bed vessel from a high purity oxygen tank (which provides product to downstream applications) while concurrently, air is introduced to the feed end of the adsorbent bed within the vessel. This enables an increased speed of increase in pressure in the bed from the intermediate desorption pressure. Next, a reduction in pressure ratio during the cycle elevates the pressure within the desorption vessel to approximately 7 psia, thereby reducing the evacuation requirements placed on the feed/vacuum blower. The above actions enable achievement of efficiency improvements on the order of 10%.

20 Claims, 6 Drawing Sheets

Step #4 Equilization-Raising Pressure

Step #5 Feed

Step #6 Feed/Make Product

Step #1a Oxygen Recovery-Depressurization

Step #1b Oxygen Recovery-Depressurization/Overlap Evacuation

Step #2 Evacuation

Step #3 Purge

Step #4a Oxygen Recovery-Pressurization/Overlap Feed

Step #4b Product Pressurization/Overlap Feed

Step #5 Feed

Step #6 Feed/Make Product

SINGLE BED PRESSURE SWING ADSORPTION PROCESS FOR RECOVERY OF OXYGEN FROM AIR

FIELD OF THE INVENTION

This invention relates to pressure swing adsorption systems for air separation and, more particularly, it relates to the use of a single bed, pressure swing adsorption system for the recovery of oxygen from air.

BACKGROUND OF THE INVENTION

Pressure swing adsorption (PSA) processes provide a commercially attractive approach for separating and purifying at least one component of a feed gas mixture which contains at least one less readily adsorbable component and at least one more readily adsorbable component. In the case of air, the more readily adsorbable component is typically nitrogen, and the less readily adsorbable component is oxygen. Adsorption occurs in an adsorbent bed at an upper adsorption pressure with the more readily adsorbable component, e.g. the nitrogen component, thereafter being desorbed from the adsorbent bed by reducing adsorbent bed pressure to a low desorption pressure.

Multi-bed PSA processes are particularly effective for oxygen plant capacities in the size range of 30,000 NCFH to 120,000 NCFH or more of oxygen. For applications with flow requirements that fall below this range, a single-bed pressure swing adsorption system is desirable. In U.S. Pat. No. 5,370,728 to LaSala et al., entitled "Single Bed Pressure Swing Adsorption System and Process", assigned to the same Assignee as this application, a single bed PSA or VPSA (vacuum pressure swing adsorption) process is disclosed which utilizes a pair of external surge tanks, one such tank supplying high purity oxygen both as the desired product and also as a purge gas to the adsorbent bed during an evacuation step of the processing cycle. The second surge tank collects void space gas (i.e., low purity oxygen) which is withdrawn from the bed during depressurization and supplies that void space gas to the adsorption bed during a repressurization of the adsorbent bed.

In FIG. 1, a diagram is shown of the LaSala et al. system which incorporates a single adsorbent bed for oxygen production. A product surge tank, hereafter called "high purity oxygen tank", is employed together with an equalization tank (hereafter called "low purity oxygen tank") to enable product recovery and to improve power requirements of the system. Line 1 is used to supply feed air to a feed/vacuum blower 2 via a dust filter 13 gas silencer unit 3 and valve 4. Line 5 from feed/vacuum blower 2 connects to lines 6 and 7, with line 6 including valve 8 and outlet snubber unit 9 from which gas is discharged through line 10. Venting of the gas stream can also be accomplished by means of valve 15 through line 14, to which is connected to unit 9. Line 7 includes outlet snubber unit 11, aftercooler 12 for feed gas cooling and a valve 13. Discharge line 14 contains a valve 15. Line 16, containing valve 17, connects to line 1 downstream of valve 4. Lines 7 and 16 both connect to line 18 which extends from the bottom portion of an adsorbent bed within adsorption vessel 19. From the top of adsorption vessel 19, a line 20 extends to and connects with line 21, valve 22 and low purity oxygen tank 23. Line 24 connects with line 20 and, via a check valve 25, connects to high purity oxygen tank 26. As described below, check valve 25 is not required in the constant product make step embodiment of the subject invention. Instead, product gas is passed through valve 29 to high purity tank 26. Product oxygen is withdrawn from high purity oxygen tank 26 through line 27. Line 20 also connects, via a valve 29, to line 28 and high purity oxygen tank 26.

The operation of the system of FIG. 1, as described in the LaSala et al. patent, involves a five step cycle having the following sequence: (1) partial depressurization; (2) evacuation; (3) purge; (4) partial repressurization and (5) pressurization and product recovery. Assuming that high purity oxygen tank 26 has received its charge of high purity oxygen from adsorbent vessel 19 and that adsorbent vessel 19 is at an upper adsorption pressure, the processing sequence begins to recycle by partially depressurizing adsorbent vessel 19. Thus, valve 13 closes and valve 15 opens, enabling feed/vacuum blower 2 to vent air to the atmosphere. Valve 22 opens and adsorbent vessel 19 begins to depressurize from the upper adsorption pressure. Void gas is displaced from the void volume in the adsorbent bed and is passed through line 21 to low purity oxygen tank 23, building to a pressure of about 14.5–15 psia. The concentration of oxygen in low purity oxygen tank 23 is typically 85–89%. Valves 8, 17 and 29, are closed during this action, which continues until the pressure in adsorbent vessel 19 falls to an intermediate pressure, e.g., 16 psia. The approximate cycle time for this partial depressurization step is about 4–7 seconds.

The vessel evacuation step occurs after adsorbent vessel 19 has expelled a portion of void gas into low purity oxygen tank 23 and the pressure in adsorbent vessel 19 has dropped to the intermediate pressure. Valves 8 and 17 are opened and valves 4, 15, 13, 22 and 29 and check valve 25 are closed. Thus, gas in adsorbent vessel 19 is diverted out line 18, through valve 17, line 16, to the inlet of feed/vacuum blower 2. This void gas is discharged through outlet silencer 9 to the atmosphere. This action enables feed/vacuum blower 2 to further evacuate adsorbent bed vessel 19 to below atmospheric pressure.

The approximate composition of the evacuation gas, averaged over the evacuation portion of the cycle, is 90% nitrogen and 10% oxygen. Adsorbent vessel 19 is evacuated to below atmospheric pressure to cause the difference in partial pressures of the nitrogen gas in the void spaces of the adsorbent to desorb and thus regenerate the adsorbent to prepare for a next cycle. The vessel evacuation step takes place until the pressure in adsorption vessel 19 reaches a lower desorption pressure, e.g., approximately 5 psia. The step time for this cycle is about 25–40 seconds.

Next, a vessel purge step occurs at the lower desorption pressure. Valve 29 opens and a small side stream of product gas from high purity oxygen tank 26 is diverted into the top of adsorbent vessel 19. The oxygen input sweeps away a large portion of the remaining void gas in vessel 19 which is comprised mainly of desorbed nitrogen. The purge gas stream displaces the desorbed gas present in the void volume of the adsorbent vessel 19. The vessel purge step occurs at a constant vacuum or other desorption pressure level, with valves 8 and 17 remaining open, control valve 29 open and all other valves closed.

When most of the desorbed gas in the void spaces of the adsorbent in adsorption vessel 19 is replaced with the product gas (oxygen), the processing sequence advances to a partial repressurization step. The average length of time for the vessel purge step is approximately 7–10 seconds.

During the partial repressurization step, valves 8, 17 and 29 are closed and valves 4 and 15 are opened to allow feed/vacuum blower 2 to run unloaded. Control valve 22 is opened and void gas from low purity oxygen tank 23 (that was collected during the partial depressurization step) is used to repressurize adsorbent vessel 19 to an intermediate pressure level, e.g., 10 psia. The time for this step is approximately 4–7 seconds.

Now that the adsorbent bed in adsorbent vessel 19 has been partially repressurized to an intermediate pressure of about 10 psia, feed air is supplied from feed vacuum blower 2 during a pressurization/product recovery step of the cycle. Under these conditions, valves 4 and 13 are open and valves 8, 15, 17, 22 and 29 are closed. Check valve 25 is adjusted so that it opens when the pressure in adsorbent vessel 19 becomes greater than the pressure in high purity oxygen tank 26.

As feed air is introduced into adsorbent bed vessel 19, the pressure therein increases until it is equal to that in high purity oxygen tank 26. Check valve 25 then opens and product gas (i.e., oxygen) is fed to high purity oxygen tank 26. The supply of product gas continues until the pressure at the top of adsorbent vessel 19 reaches an upper adsorption pressure, typically about 22.5 psia. Now, high purity oxygen tank 26 is available to provide oxygen for downstream use, independent of adsorbent vessel 19. A typical time for this portion of the process is about 18–25 seconds.

Feed/vacuum blower 2 has a limited differential pressure capability, and exhibits lower efficiency at high compression ratios. Thus, it is desirable that the cycle minimize the operating vacuum level to reduce that pressure differential. Such action results in feed/vacuum blower 2 operating in a more efficient range and also results in elevated suction pressure, hence, increasing the waste capacity of the machine at higher efficiency. Further, both high separation efficiency and high adsorbent utilization are desirable to assure lowest power consumption and largest capacity for a given investment.

Accordingly, it is an object of this invention to provide an improved method of operation for a single bed, pressure swing adsorption system.

It is another object of this invention to provide a method for reducing differential pressure across a compressor utilized in a single bed pressure swing adsorption system.

It is yet another object of this invention to provide an improved single bed, pressure swing adsorption system wherein the time required for individual portions of the operating cycle are reduced, thereby enabling higher system efficiency.

SUMMARY OF THE INVENTION

A pressure swing adsorption process for the recovery of oxygen from air improves upon the prior art by depressurizing the adsorbent bed within an adsorbent vessel to an intermediate pressure by releasing void space gas from the product end of the vessel to a low purity oxygen tank while concurrently evacuating the adsorbent vessel from the feed end. This action enables an increased speed of depressurization and a reduction of the cycle time. Further, the adsorbent bed is repressurized to an intermediate pressure from the product outlet end with gas from the low purity oxygen tank, while concurrently pressurizing the adsorbent vessel from the input feed end. This action increases the load time fraction for a feed/vacuum blower. Further, oxygen is introduced to the product end of the adsorbent bed vessel from a high purity oxygen tank (which provides product to downstream applications) while concurrently, air is introduced to the feed end of the adsorbent bed within the vessel. This enables an increased speed of increase in pressure in the bed from the intermediate desorption pressure. Next, a reduction in pressure ratio during the cycle elevates the pressure within the desorption vessel to approximately 6–7 psia, thereby reducing the evacuation requirements placed on the feed/vacuum blower. The above actions enable achievement of efficiency improvements on the order of 10%.

DETAILED DESCRIPTION OF A PREFERRED EMBODIMENT

Figure 1:
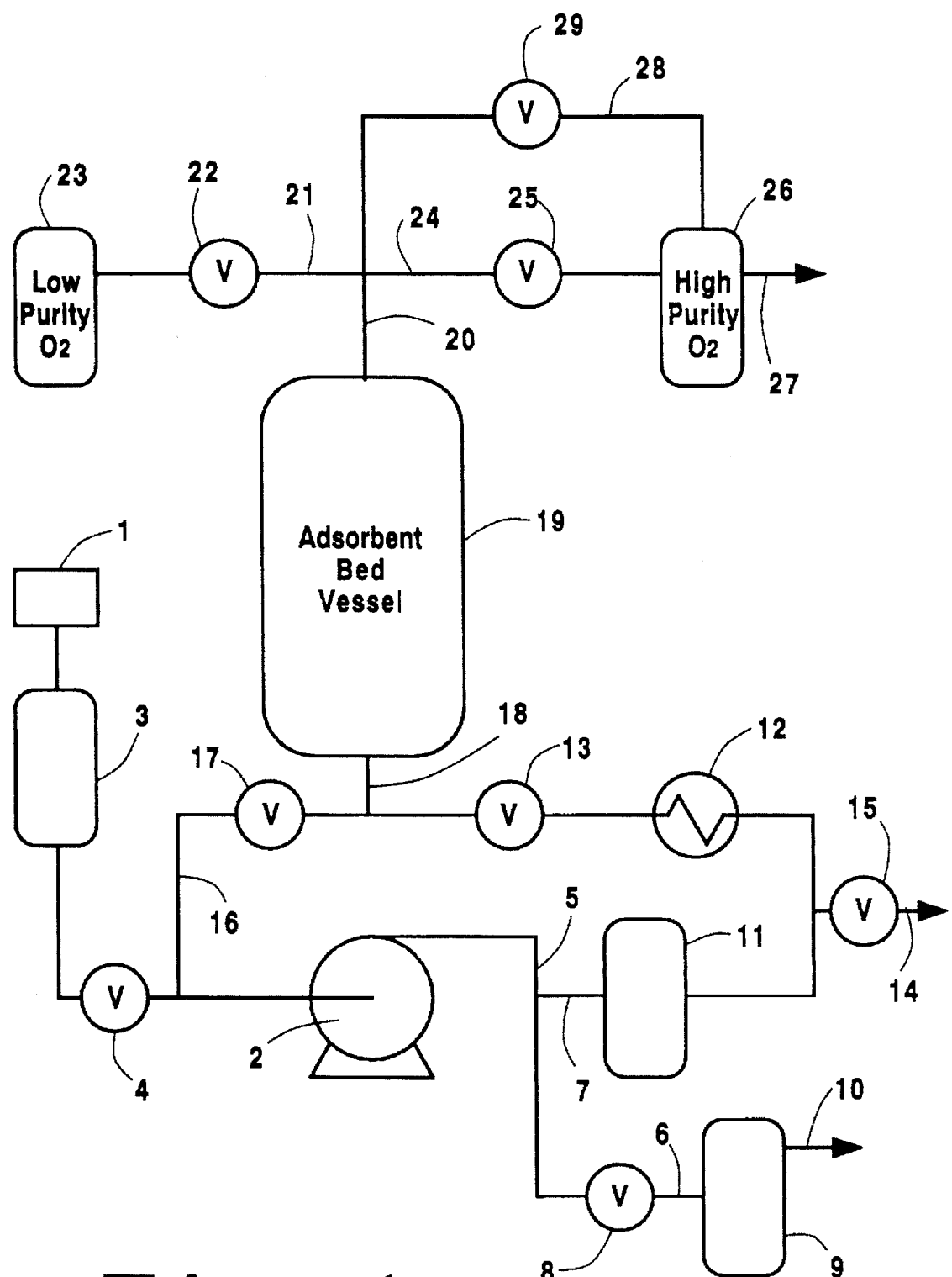
FIG. 1 is a schematic flow diagram of a prior art embodiment of a single bed, VPSA system for the production of oxygen from air.

As will be apparent from the description below, a VPSA cycle in conformance with the invention exhibits four main improvements over the VPSA cycle disclosed in the above noted U.S. Pat. No. 5,370,728. The improvements are:

1. An elevated bottom pressure of about 6–7 psia which enables optimization of the feed/vacuum blower.
2. A product pressurization step that is combined with both an oxygen recovery step and a purge step to enable a reduction in cycle time.
3. Use of an overlap oxygen recovery, pressurization/feed air step; and
4. Use of an overlap oxygen recovery depressurization/ evacuation step.
5. Use of oxygen from the high purity oxygen tank for product pressurization reflux and low purity oxygen from the low purity oxygen tank for an oxygen recovery step and purge reflux requirements.

Implementation of each of the enumerated improvements included in the practice of the invention enables a lower pressure ratio to be utilized for the VPSA cycle (i.e., 20–22 psia top and 6–7 psia bottom); an approximate 2–3% improvement in efficiency resulting from the use of low purity oxygen in the purge step; an approximate 3% efficiency improvement resulting from the use of high purity oxygen (from the high purity oxygen tank) for product pressurization; and an approximate 10% improvement resulting from overlap of compression and oxygen recovery steps.

The improved VPSA cycle is optimized at about 90–93% oxygen product purity. The VPSA cycle can be made to operate at purities as high as 95% with a reduction in efficiency. The VPSA cycle can also operate at lower product purities, i.e., 80%–90%. The VPSA cycle time may vary depending on adsorbent inventory, with an optimum cycle time being 50 seconds (which may very from 30–70 seconds depending on bed size).

The VPSA cycle of the invention operates at a higher bottom pressure than conventional cycles. This not only improves efficiencies over the entire operating range, but also results in a higher average suction pressure which more closely balances feed and vacuum requirements from a common blower.

The VPSA cycle, employing overlapped oxygen recovery/compression steps, places the blower into a feed or vacuum function while simultaneously completing the oxygen recovery step. This results in gas flow into and out of the adsorber bed from both the top and bottom of the adsorber bed vessel. This action improves the utilization of the compression equipment and results in increased capacity for a given size adsorber bed and blower.

Because of an elevated bottom pressure, there is an increased need for oxygen reflux in the cycle. An oxygen purge step, in combination with the product pressurization step provides this increased oxygen requirement. The oxygen purge requirement is provided by void gas from the low purity oxygen surge tank. Product pressurization gas is provided by high purity oxygen from the high purity oxygen tank. As above stated, the low purity oxygen reflux void gas is used in the purge step and oxygen recovery pressurization steps. The high purity oxygen is used last in the product pressurization step. This action results in optimal use of the oxygen reflux by introducing the higher purity oxygen just before the product make step, thus eliminating purity anomalies often associated with a start of the product make step. Lastly, the VPSA cycle does not require a pressure blow down step which results in reduced oxygen recovery.

Turning now to FIGS. 2–7, each thereof is a schematic of the individual steps described above with respect to the prior art VPSA cycle disclosed in U.S. Pat. No. 5,370,728. FIGS. 8–15 are the steps of a single bed VPSA cycle employing the invention. Prior to describing in detail the comparative steps shown in the FIGS., Tables 1 and 2 below illustrate the step times, start pressures and end pressures of each of the steps of the cycle for both the prior art process taught by U.S. Pat. No. 5,370,728 and for a process incorporating the invention. Note that the '728 patent's cycle requires approximately 65 seconds, whereas the cycle employing the invention requires approximately 49 seconds. Further, the maximum and minimum pressures employed in the cycle described in the '728 patent are 22.5 psia and 5 psia whereas they are 22 psia and 7 psia in the cycle according to the invention.

TABLE 1

Single Bed VPSA Cycle

| U.S. Pat. No. 5,370,728 Step | Step Time (seconds) | Start Pressure (psia) | End Pressure (psia) |
| --- | --- | --- | --- |
| 1. Equalization-falling pressure | 4 | 22.5 | 16 |
| 2. Evacuation | 30 | 16 | 5 |
| 3. Purge | 7 | 5 | 5 |
| 4. Equalization-raising pressure | 4 | 5 | 9.5 |
| 5. Feed | 6 | 9.5 | 20 |
| 6. Feed make product | 14 | 20 | 22.5 |
| Total Time | 65 | | |

TABLE 2

Single Bed VPSA Cycle

| Invention Step | Step Time (seconds) | Start Pressure (psia) | End Pressure (psia) |
| --- | --- | --- | --- |
| 1a. Oxygen recovery-depressurization | 3 | 22 | 18 |
| 1b. Oxygen recovery/overlap evacuation | 1 | 18 | 16 |
| 2. Evacuation | 20 | 16 | 7 |
| 3. Purge | 6.5 | 7 | 9 |
| 4a. Oxygen recovery/overlap feed | 1.5 | 9 | 13 |
| 4b. Product pressurization overlap feed | 4 | 13 | 18 |
| 5. Feed | 4 | 18 | 20 |
| 6. Feed make product | 9 | 20 | 22 |
| Total Time | 49 | | |

Figure 2:
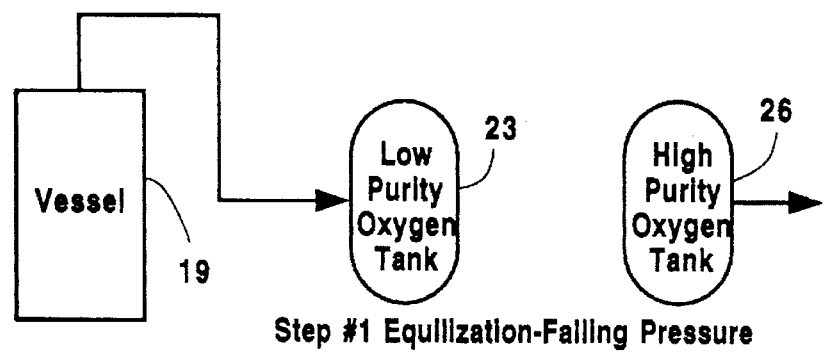
FIGS. 2–7 are schematic illustrations of sequential steps of a processing sequence employed in the prior art system shown in U.S. Pat. No. 5,370,728.
Figure 8:
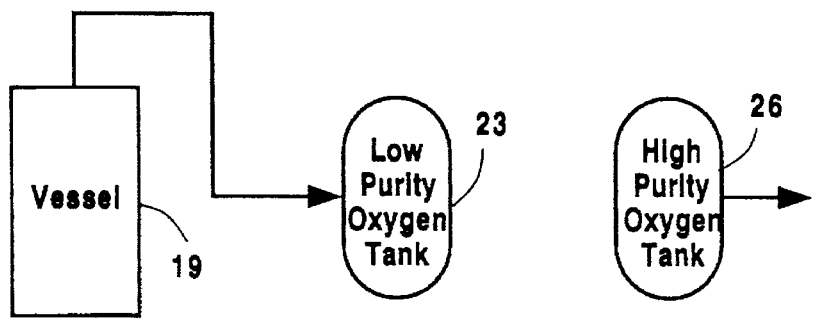
FIGS. 8–15 are schematic illustrations of the steps of the invention showing which steps have been added/modified as compared to the prior art to achieve improved process efficiency.

FIG. 2 illustrates step 1 of the cycle described in the LaSala et al. patent wherein adsorbent vessel 19 depressurizes, enabling void gas to pass to low purity oxygen tank 23. FIG. 8 illustrates depressurization step 1a as performed by the invention which occurs after adsorbent vessel 19 has reached the maximum adsorption pressure of approximately 22 psia and product make is complete. Feed/vacuum blower 2 is unloaded by venting it to the atmosphere and adsorbent vessel 19 is depressurized from 22 psia to 18 psia (end pressures of 14–20 psia can be used). The top gas is oxygen rich and is delivered to low purity oxygen tank 23 to be used as reflux later in the cycle. The purity of this gas starts at the 90% product quality level and falls as the adsorption front advances towards the top of the adsorbent bed within adsorbent vessel 19. The step time is 2–4 seconds.

Figure 9:
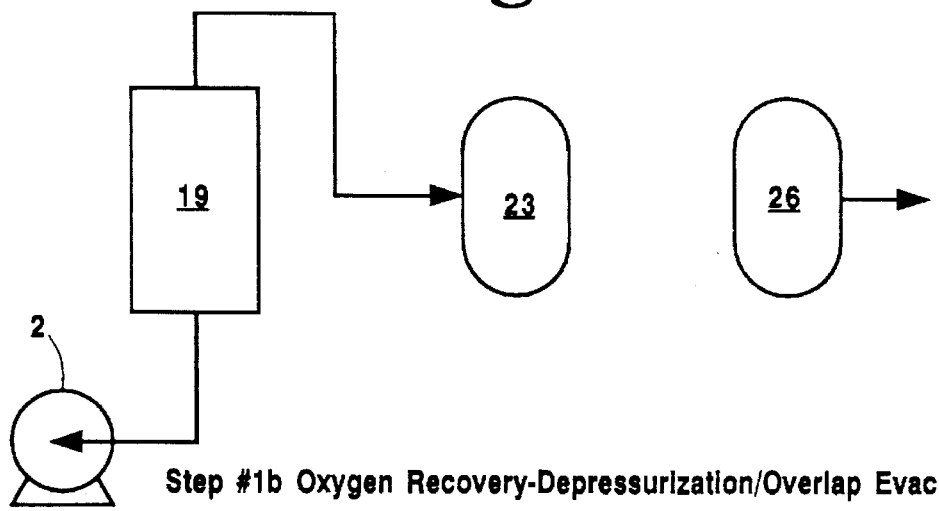

As shown in FIG. 9, the process of the invention moves to step 1b, wherein the pressure in the adsorbent vessel 19 has fallen to about 18 psia. At such time, feed/vacuum blower 2 begins removing waste gas from the bottom of adsorbent vessel 19. The oxygen recovery depressurization flow from the top of adsorbent vessel 19 continues until the pressure level in the adsorbent bed is equal to the pressure in low purity oxygen tank 23. The cut off pressure for this step is about 15–17 psia and the step time is 1–2 seconds.

Figure 3:
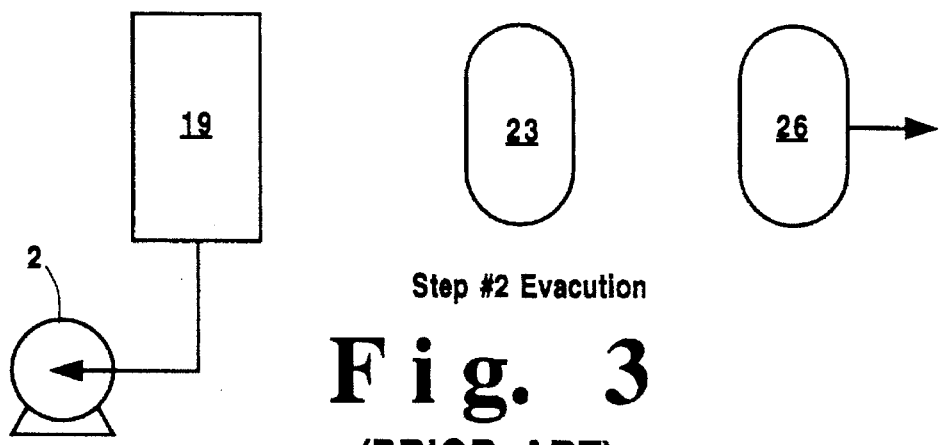
Figure 4:
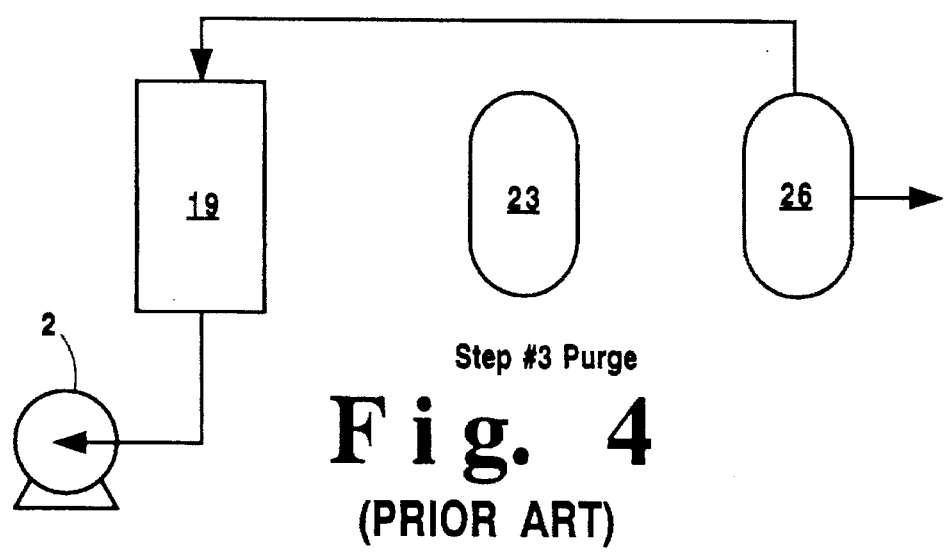
Figure 10:
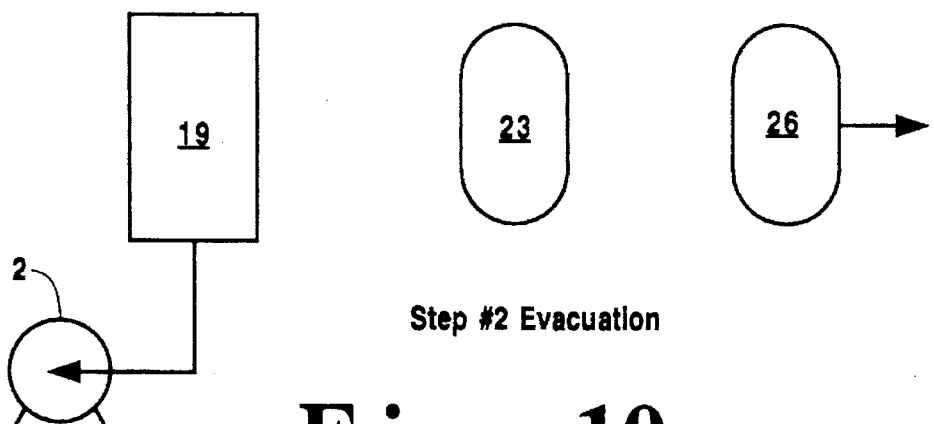

As shown in FIG. 3, step 2 of the prior art system next evacuates adsorbent vessel 19 down to its end pressure of approximately 5 psia. As shown in FIG. 10, step 2 of the invention also performs the identical step, but it only needs to reduce the pressure in adsorbent vessel 19 from 16 to 6–7 psia. The step time is approximately 20 seconds as compared to the step time in FIG. 3 of 30 seconds (to get to 5 psia). During step 2, adsorbent bed vessel 19 is closed at the top and vacuum pumped to remove waste nitrogen from the vessel. Variations in the bottom pressure can be achieved, but at the expense of efficiency.

Step 3 in both the prior art (FIG. 4) and the invention (FIG. 11), involves the purging of adsorbent vessel 19. During this step, feed/vacuum blower 2 removes waste nitrogen from the bottom of adsorbent vessel 19 while oxygen purge gas enters the top. As contrasted to the prior art (FIG. 4) wherein purge gas is retrieved from high purity oxygen tank 26, in the invention, purge gas is obtained from low purity oxygen tank 23. A preferred condition is that the pressure level be slightly raised during the step. The pressure level is controlled by regulating the oxygen purge flow rate and completes the waste removal period of the cycle, with the oxygen front falling very near the bottom of the adsorber bed within adsorbent vessel 19. Step 3 is completed when waste purity at the bottom of the adsorber bed begins to slowly rise, signalling oxygen break through. The step time is 5–9 seconds.

Figure 5:
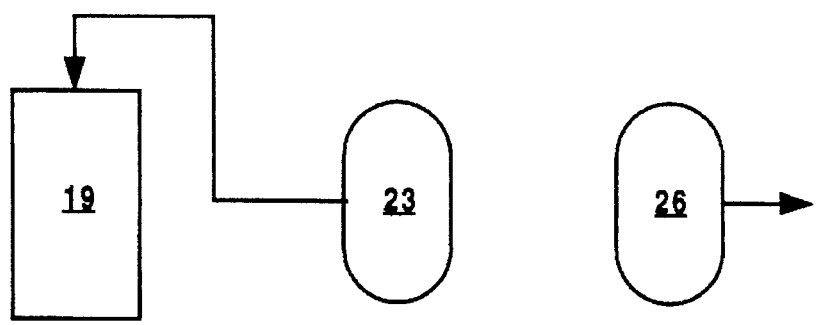
Figure 12:
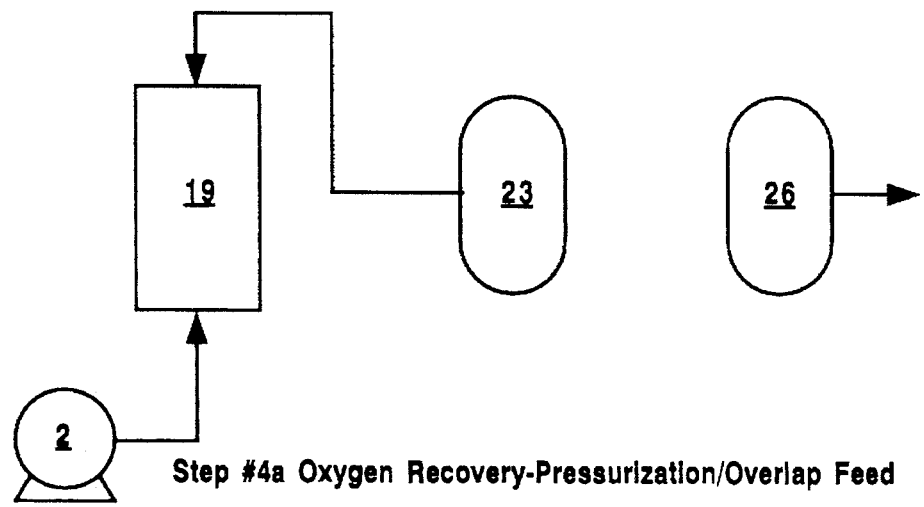
Figure 13:
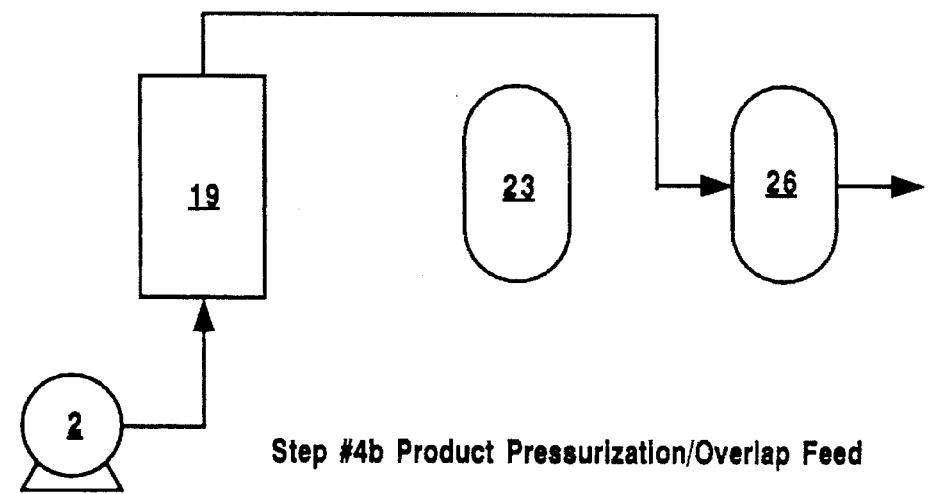
Figure 14:
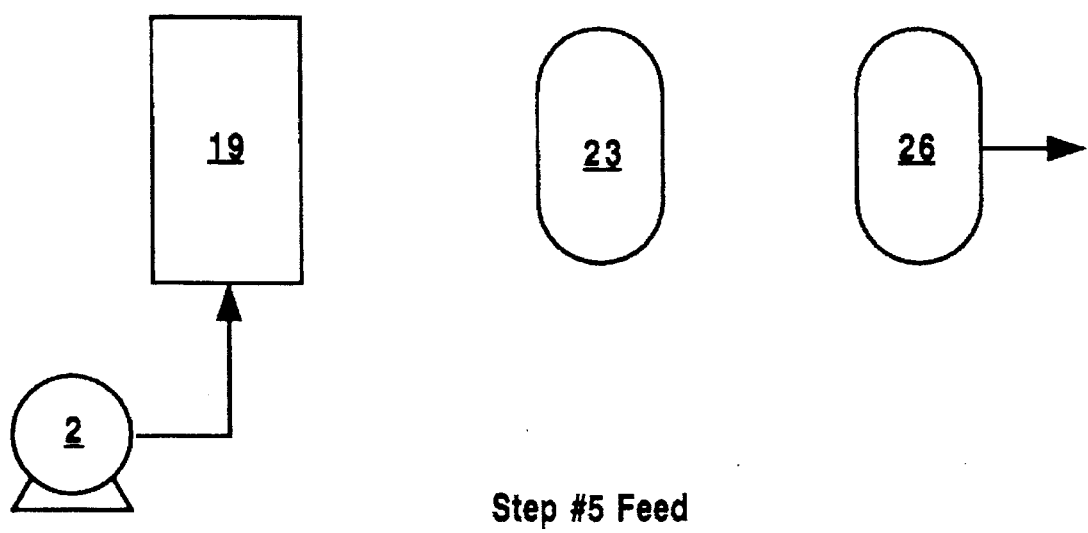

The next step in the prior art (step 4) involves equalization and the raising of pressure within adsorbent vessel 19 by switching the oxygen feed from high purity oxygen tank 26 to low purity oxygen tank 23 (FIG. 5). In FIGS. 12 and 13, the same action is accomplished by the substeps of oxygen recovery-pressurization/overlap feed (step 4a) and product pressurization/overlap feed (step 4b). In step 4a, feed air is introduced by feed/vacuum blower 2 into the bottom of adsorbent vessel 19 and the pressure therein begins to rise. The pressure level rises from about 9 psia to 13 psia. Oxygen reflux gas is simultaneously introduced to the top of adsorbent vessel 19 from low purity oxygen tank 23. The purity of this oxygen is between 85 and 90%.

The introduction of oxygen gas during step 4a (FIG. 12) increases the utilization of feed/vacuum blower 2, maximizing capacity for the unit. The bed pressure rises rapidly and allows the bulk air feed to be introduced at as high a pressure as possible. The step time of step 4a is 1–2 seconds.

In FIG. 13, step 4b continues introduction of feed air from feed/vacuum blower 2, while oxygen reflux gas is simultaneously introduced into the top of adsorbent vessel 19, but now from high purity oxygen vessel 26. The pressure rises from 13 psia to 18 psia during this step. The purity of the inlet oxygen is now 90%, or product quality. By utilizing oxygen from high purity oxygen tank 26, reflux oxygen is raised to a level equal to that of the product as the adsorbent bed nears the product make step. The step time for this portion of the cycle is approximately 3–5 seconds.

Figure 6:
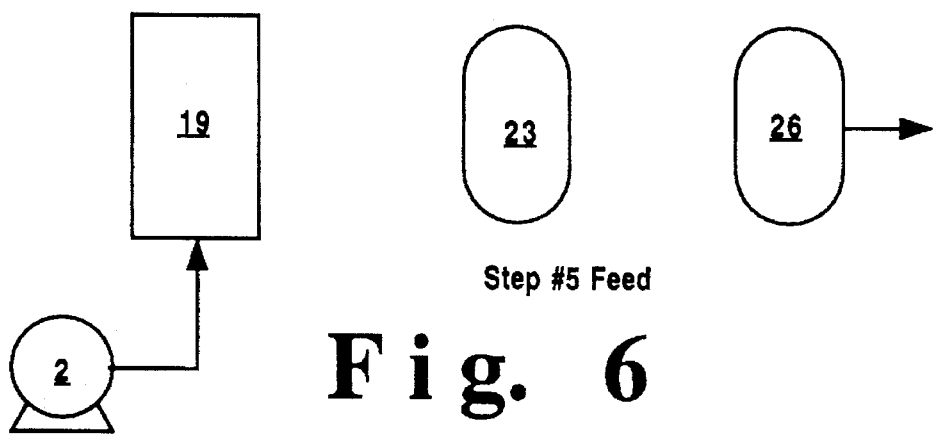
Figure 7:
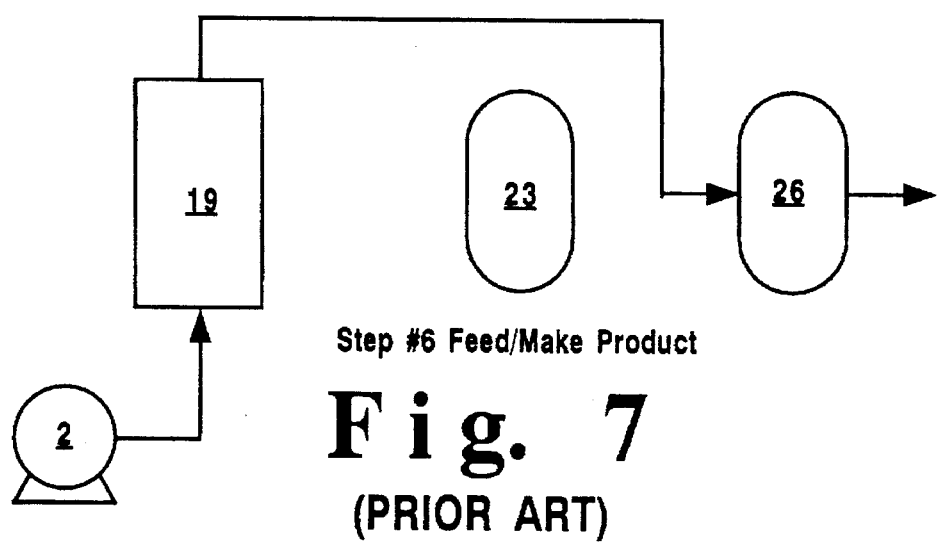

As shown in FIG. 6, the prior art step 5 continues the cycle by a feed step wherein air is introduced by feed/vacuum blower 2 into the bottom of adsorbent vessel 19. As can be seen from FIG. 14, an identical step 5 occurs in the invention, with the pressure feed air being continued until the pressure in adsorption vessel 19 reaches the product make pressure. This pressure is as close to the top pressure as possible and may vary depending on the size of high purity oxygen tank 26. The final pressure at the end of this step is about 19–21 psia, and the step time is 4 seconds.

Finally, the feed/make product step 6 of the prior art process (FIG. 7) involves continuing the feed of air from feed/vacuum blower 2 into adsorbent vessel 19 and feeding the oxygen from the top of vessel 19 into high purity oxygen tank 26.

Figure 15:
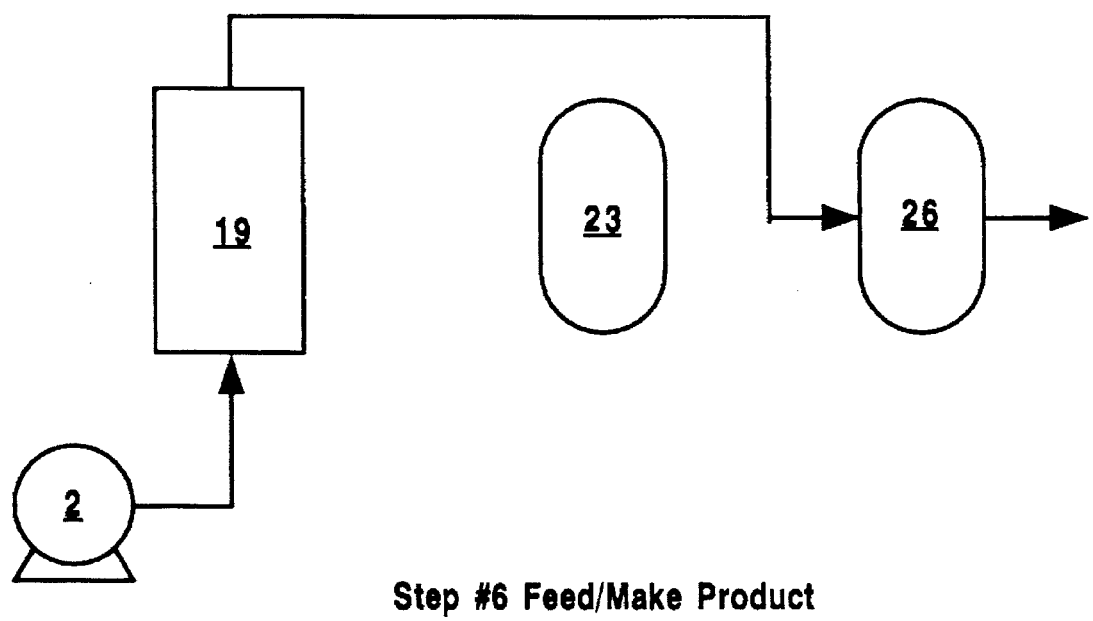

As shown in FIG. 15, feed/make product step 6 is utilized wherein feed air is introduced into the bottom of adsorbent vessel 19 at or near the top pressure. Because of the use of oxygen from the product pressurization/overlap feed (shown in FIG. 13), there are no purity fluctuations at the beginning of the make step. The improved process also operates with a relatively constant pressure, product make step, with reduced high purity reflux requirements as compared to the original cycle. Therefore, the step time for feed/make product step 6 is 9 seconds, as compared to 14 seconds for step 6 shown in FIG. 7.

Step 6 can be operated in a rising pressure or relatively constant pressure mode. A constant pressure product make system is preferred. The oxygen separation front does not break through during the product make step nor do any large fluctuations in purity exist at the start of the product make due to the introduction of product quality oxygen as pressurization gas prior to the product make step (see FIG. 13). The pressure at the end of step 6 is the final top pressure of 20–22 psia.

The above described cycle produces a relatively constant purity oxygen flow during the product make period. The product is accumulated in high purity oxygen tank 26 for continuous delivery to a customer. The pressure level fluctuations of the oxygen product can be controlled by sizing of tank 26 and a product oxygen pressure control system. The accumulation of product into tank 26 also acts as a mixing tank and achieves nearly constant product purity.

The VPSA cycle shown in FIGS. 8–15 can be made to operate without the oxygen recovery/depressurization/overlap evacuation step shown in FIG. 9. The overlap oxygen recovery/depressurization/overlap evacuation step is used to optimize the vacuum pump utilization and is affected by the size of low purity oxygen tank 23. Further, while a top pressure of 20–22 psi and a bottom pressure of about 6–7 psi are preferred, the top and bottom pressure levels can also be varied in the cycle. This would occur to optimize the performance of specific adsorbents and machines (e.g., bottom pressures of 5–9 psia and top pressures of 19–24 psia).

Figure 11:
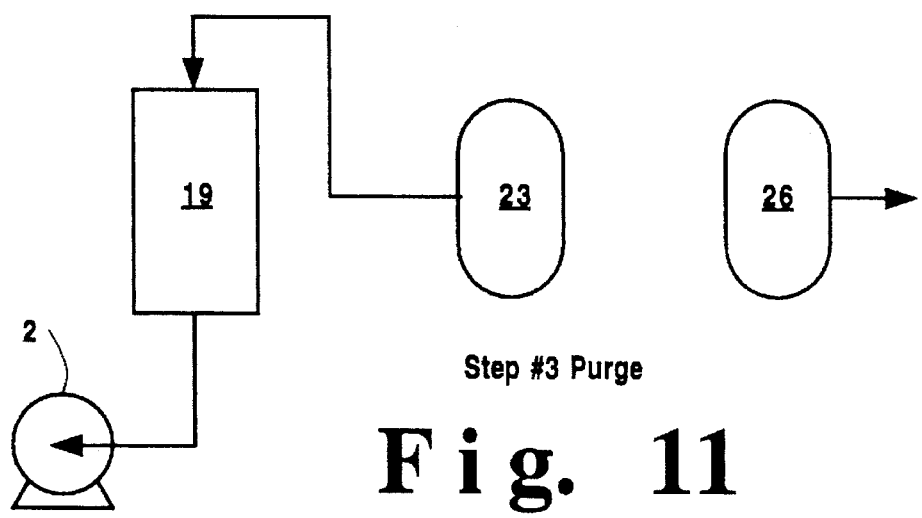

The purge step shown in FIG. 11 can also be varied, depending on the bottom pressure and adsorbent characteristics. The purge step normally occupies approximately 10% of the cycle time. By adjusting pressures and purge flow rates, the time of the purge step can be varied from 0 to 15% of the cycle time.

The product pressurization step shown in FIG. 13 can also be increased or decreased to provide pressurization gas for a varying length of time. The amount of product pressurization gas used is a function of the size of high purity oxygen tank 26.

Lastly, the cycle can be made to operate with a constant pressure versus rising pressure product make. The size of high purity oxygen tank 26 and the specifics of the product oxygen flow control can be used to alter the pressure profile during the product make step. Cycle testing has shown that capacity increases of 3–4% are expected with a constant pressure system. The cycle now operates with the high and low purity tanks (26 and 23) communicating with the adsorber via valves 29 and 22, respectively. The improved cycle can now be operated without check valve 25 as valve 29 can be controlled to operate as a check valve.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A pressure swing adsorption process for the recovery of oxygen from air, said process comprising the steps of:

(a) introducing feed air to a feed end of an adsorbent vessel which includes a single bed of adsorbent material capable of selectively adsorbing nitrogen, the pressure in said bed of adsorbent material increasing from an intermediate adsorption pressure to an upper adsorption pressure as a result of introduction of said air;

(b) introducing additional quantities of feed air to the adsorbent vessel at the upper adsorption pressure, with oxygen passing from a product end of the adsorbent vessel to a high purity oxygen tank at said upper adsorption pressure;

(c) depressurizing said bed of adsorbent material to said intermediate pressure by release of void space gas from the product end of said bed to a low purity oxygen tank;

(d) further depressurizing the bed of adsorbent material from said intermediate pressure to a lower desorption pressure by evacuation of additional quantities of gas from said feed end;

(e) passing a stream of void space gas from the low purity oxygen tank to the product end of the bed as a purge gas to displace desorbed nitrogen from the bed of adsorbent material at the lower desorption pressure, the displaced desorbed nitrogen being discharged from the feed end of said bed;

(f) introducing void space gas from said low purity oxygen tank to the product end of the bed while concurrently introducing air to said feed end of said bed, to cause an increase in pressure in the bed from the lower desorption pressure to an intermediate desorption pressure; and (g) passing additional quantities of feed air to the feed end of said bed to raise the pressure therein, as cyclic operation of steps (a)–(f) above is continued.

2. The process as recited in claim 1 and including, in step (a), passing oxygen from the product end of the adsorbent vessel to the high purity oxygen tank at a pressure approaching said upper adsorption pressure, with or without the introduction of additional quantities of feed air to the adsorbent vessel at the upper adsorption pressure, and passage of oxygen from the product end of the adsorbent vessel to said high purity oxygen tank at said upper adsorption pressure, in said step (b).

3. The process as recited in claim 2 and including the introduction of additional quantities of feed air to the adsorbent vessel at the upper adsorption pressure in step (b).

4. The process as recited in claim 2 without the introduction of additional quantities of feed air to the adsorbent vessel at the upper adsorption pressure in step (b).

5. The process as recited in claim 1, and including, following step (f), introducing oxygen from said high purity oxygen tank to the product end of said bed of adsorbent material, while concurrently introducing air to said feed end of said bed, to enable an increase in pressure in the bed from the intermediate desorption pressure.

6. The process as recited in claim 2, and including, after step (c), further depressurizing said bed of adsorbent material by release of void space gas from the product end of said bed to the low purity oxygen tank, while concurrently evacuating said adsorbent vessel from the feed end thereof.

7. The process as recited in claim 1, and including, after step (f), introducing oxygen from said high purity oxygen tank to the product end of said bed of adsorbent material, while concurrently introducing air to said feed end of said bed, to enable an increase in pressure in the bed from the intermediate desorption pressure.

8. The process as recited in claim 7, wherein said lower desorption pressure is within a range of about 5–9 psia.

9. The process as recited in claim 7, wherein said lower desorption pressure is about 6.5 psia.

10. The process as recited in claim 9, wherein said upper adsorption pressure lies within a range of about 20–24 psia.

11. The process as recited in claim 9, wherein said upper adsorption pressure is about 22 psia.

12. The process as recited in claim 1, and including, after step (c), further depressurizing said bed of adsorbent material by release of additional quantities of void space gas from the product end of said bed to the low purity oxygen tank, while concurrently evacuating said adsorbent vessel from the feed end thereof.

13. A pressure swing adsorption process for the recovery of oxygen from air, said process comprising the steps of:

(a) introducing feed air to a feed end of an adsorbent vessel including a single bed of adsorbent material capable of selectively adsorbing nitrogen, the pressure in said bed of adsorbent material increasing from an intermediate adsorption pressure to an upper adsorption pressure as a result of introduction of said air;

(b) introducing additional quantities of feed air to the adsorbent vessel at the upper adsorption pressure, with oxygen passing from a product end of the adsorbent vessel to a high purity oxygen tank at said upper adsorption pressure;

(c) depressurizing the bed to said intermediate pressure by a release of void space gas from the product end of the bed to a low purity oxygen tank;

(d) further depressurizing the bed from said intermediate pressure to a lower desorption pressure by evacuation of additional quantities of gas from said feed end;

(e) passing a stream of void space gas from the low purity oxygen tank to the product end of the bed as a purge gas to displace desorbed nitrogen from the bed at the lower desorption pressure, the displaced desorbed nitrogen being discharged from the feed end of the bed;

(f) introducing void space gas from said low purity oxygen tank to the product end of the bed while concurrently introducing air to said feed end of said bed, to cause an increase in pressure in the bed from the lower desorption pressure to an intermediate desorption pressure;

(g) introducing oxygen from said high purity oxygen tank to the product end of the bed while concurrently introducing air to said feed end of said bed, to enable an increase in pressure in the bed from the intermediate desorption pressure; and (h) passing additional quantities of feed air to the feed end of said bed to raise the pressure therein, as cyclic operation of (a)–(g) above is continued.

14. The process as recited in claim 13 and including, in step (a), passing oxygen from the product end of the adsorbent vessel to the high purity oxygen tank at a pressure approaching said upper adsorption pressure, with or without the introduction of additional quantities of feed air to the adsorption vessel at the upper adsorption pressure, and passage of oxygen from the product end of the adsorbent vessel to said high purity oxygen tank at said upper adsorption pressure, in said step (b).

15. The process as recited in claim 14, and including, after step (c), further depressurizing said bed of adsorbent material by release of additional quantities of void space gas from the product end of said bed to the low purity oxygen tank, while concurrently evacuating said adsorbent vessel from the feed end thereof.

16. The process as recited in claim 13, and including, after step (c), further depressurizing said bed of adsorbent material by release of additional quantities of void space gas from the product end of said bed to the low purity oxygen tank, while concurrently evacuating said adsorbent vessel from the feed end thereof.

17. The process as recited in claim 13, wherein said lower desorption pressure is within a range of about 5–9 psia.

18. The process as recited in claim 13, wherein said lower desorption pressure is about 7 psia.

19. The process as recited in claim 18, wherein said upper adsorption pressure lies within a range of about 20–24 psia.

20. The process as recited in claim 19, wherein said upper adsorption pressure is about 22 psia.

* * * * *